United States Patent
Gill

(12) United States Patent (10) Patent No.: US 7,330,340 B2
Gill (45) Date of Patent: Feb. 12, 2008

(54) MAGNETORESISTIVE SENSOR WITH FREE LAYER BIAS ADJUSTMENT CAPABILITY

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 490 days.

(21) Appl. No.: 11/052,968

(22) Filed: Feb. 7, 2005

(65) Prior Publication Data
US 2006/0176621 A1 Aug. 10, 2006

(51) Int. Cl.
G11B 5/127 (2006.01)
(52) U.S. Cl. .............................. 360/324.12
(58) Field of Classification Search ........... 360/324.12, 360/324.11, 324.1, 324.2
See application file for complete search history.

(56) References Cited

U.S. PATENT DOCUMENTS

| | | | |
|---|---|---|---|
| 6,614,630 B2 | 9/2003 | Horng et al. .......... 360/324.12 |
| 6,657,825 B2 * | 12/2003 | Ho et al. .................. 360/321 |
| 6,680,830 B2 * | 1/2004 | Gill ........................... 360/321 |
| 6,721,145 B2 | 4/2004 | Beach .................. 360/324.11 |
| 6,780,524 B2 | 8/2004 | Lin et al. .................... 428/611 |
| 6,866,751 B2 * | 3/2005 | Gill et al. ................ 204/192.2 |
| 7,036,208 B2 * | 5/2006 | Ho et al. .................. 29/603.13 |
| 2002/0085323 A1 | 7/2002 | Smith et al. ........... 360/324.12 |
| 2003/0087133 A1* | 5/2003 | Zheng et al. ........ 428/694 BM |
| 2004/0066668 A1 | 4/2004 | Gider et al. ................ 365/171 |
| 2005/0002132 A1 | 1/2005 | Gill ....................... 360/324.12 |

* cited by examiner

Primary Examiner—Allen Cao
(74) Attorney, Agent, or Firm—Zilka-Kotab, PC

(57) ABSTRACT

A magnetoresistive sensor having a free layer biased by an in stack bias layer that has a magnetic moment canted with respect to the ABS, such that the magnetic moment of the biasing layer has a longitudinal component in a direction parallel with the ABS and a component in a transverse direction that is perpendicular to the ABS. The transverse component of the bias layer moment creates a balancing field in the free layer that counterbalances the coupling field in the free layer generated by the pinned layer. The counterbalance field provided by the canted moment of the biasing layer is especially useful in a tunnel valve sensor, because the very thin barrier layer of the tunnel valve design generates a strong coupling field in the free layer and this coupling field cannot be offset by a field from the sensor current.

12 Claims, 3 Drawing Sheets

MAGNETORESISTIVE SENSOR WITH FREE LAYER BIAS ADJUSTMENT CAPABILITY

FIELD OF THE INVENTION

The present invention relates to free layer biasing, and more particularly to free layer biasing in a current perpendicular to plane magnetoresistive sensor such as a tunnel valve.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

The advent of perpendicular recording systems has lead to an increased interest in current perpendicular to plane (CPP) sensors, which are particularly suited to use in perpendicular recording systems, due to their ability to read signals from a high coercivity medium. This is in part due to the short gap height afforded by such CPP sensors which allows them to read a very short bit of data. A CPP sensor differs from a more conventional current in plane (CIP) sensor such as that discussed above in that the sense current flows through the CPP sensor from top to bottom in a direction perpendicular to the plane of the layers making up the sensor. Whereas the more traditional CIP sensor has insulation layers separating it from the shields, the CPP sensor contacts the shields at its top and bottom surfaces, thereby using the shields as leads.

A CPP sensor can be in the form of a CPP GMR sensor which operates based upon the spin dependent scattering of electrons as described above.

Another type of CPP sensor is what has been referred to as a tunnel junction sensor or tunnel valve. A tunnel valve operates based upon the spin dependent tunneling of electrons through a thin electrically insulating barrier layer. The tunnel valve has a free layer and a pinned layer similar to a GMR sensor, however, the free layer and pinned layer are separated from one another by a thin electrically insulating barrier layer rather than by a conductive spacer layer. The barrier layer can be for example alumina. When the magnetic moments of the free layer and the pinned layer are parallel, the electrical resistance through the barrier layer is at a minimum and when the moments are antiparallel the resistance through the barrier is at a maximum.

A challenge to the development of CPP sensors has been that the coupling field from the pinned layer prevents the free layer from maintaining a desired neutral magnetic moment biased in a direction parallel with the ABS. Because the pinned layer has its magnetic moment pinned in a direction perpendicular to the ABS, the coupling field from the pinned layer acts on the free layer to cant the moment of the free layer in a direction that is not parallel with the ABS as would be desired. This problem is especially acute in a tunnel valve design, because the coupling field across the very thin barrier layer is very strong compared with that through a thicker electrically conductive spacer layer. Also, in prior art current in plane (CIP) sensors this coupling field was offset by an opposite magnetic field from the currently flowing through the sensor from one side to the other along the planes of the sensor. However, in a CPP sensor such as a tunnel valve, the sense current does not produce a magnetic field that can counteract the coupling field from the pinned layer.

Therefore, there is a strong felt need for a sensor design that can maintain balanced free layer biasing in a current perpendicular to plane sensor such as a CPP GMR or a tunnel valve. Such a sensor design would preferably incorporate an in stack bias layer since such bias structures are more suitable for use in a CPP sensor than are laterally disposed hard bias layers.

SUMMARY OF THE INVENTION

The present invention provides a sensor design that overcomes the signal asymmetry effect of a pinned layer coupling field on the free layer of the sensor. The invention includes an in stack bias structure that includes a ferromagnetic bias layer that is exchange coupled to a layer of antiferromagnetic material and that is separated from the free layer by an antiparallel coupling layer. The magnetic moment of the bias layer is pinned in a direction that includes a longitudinal component that is parallel with the ABS and a transverse component that is perpendicular to the ABS.

The parallel, longitudinal component of the bias layer moment generates a bias field that biases the free layer in an antiparallel direction parallel to the ABS as desired. The angle of the bias layer moment is determined at wafer level manufacturing to balance the coupling field from the pinned layer. The angle required might be different from wafer to wafer. The transverse component of the magnetic moment of the bias layer generates a counter balancing field in the free layer that is preferably equal and opposite to a coupling field from the pinned layer in order to balance the transverse fields within the free layer.

The pinned layer structure may be a tri-layer structure having three ferromagnetic layers that are antiparallel coupled with one another. The first or outermost ferromagnetic layer can be exchange coupled with a layer of antiferromagnetic material which strongly pins its magnetic moment in a direction perpendicular to the ABS. The trilayer structure ensures that the transverse component of the bias layer moment will be oriented in the same direction as that of the first (exchange coupled) ferromagnetic layer. This advantageously ensures that when the bias layer moment is set by annealing, the transverse component of the anneal field will be in the same direction as the direction of the moment of the pinned layer, thereby preventing degradation of the previously set pinning of the pinned layer.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
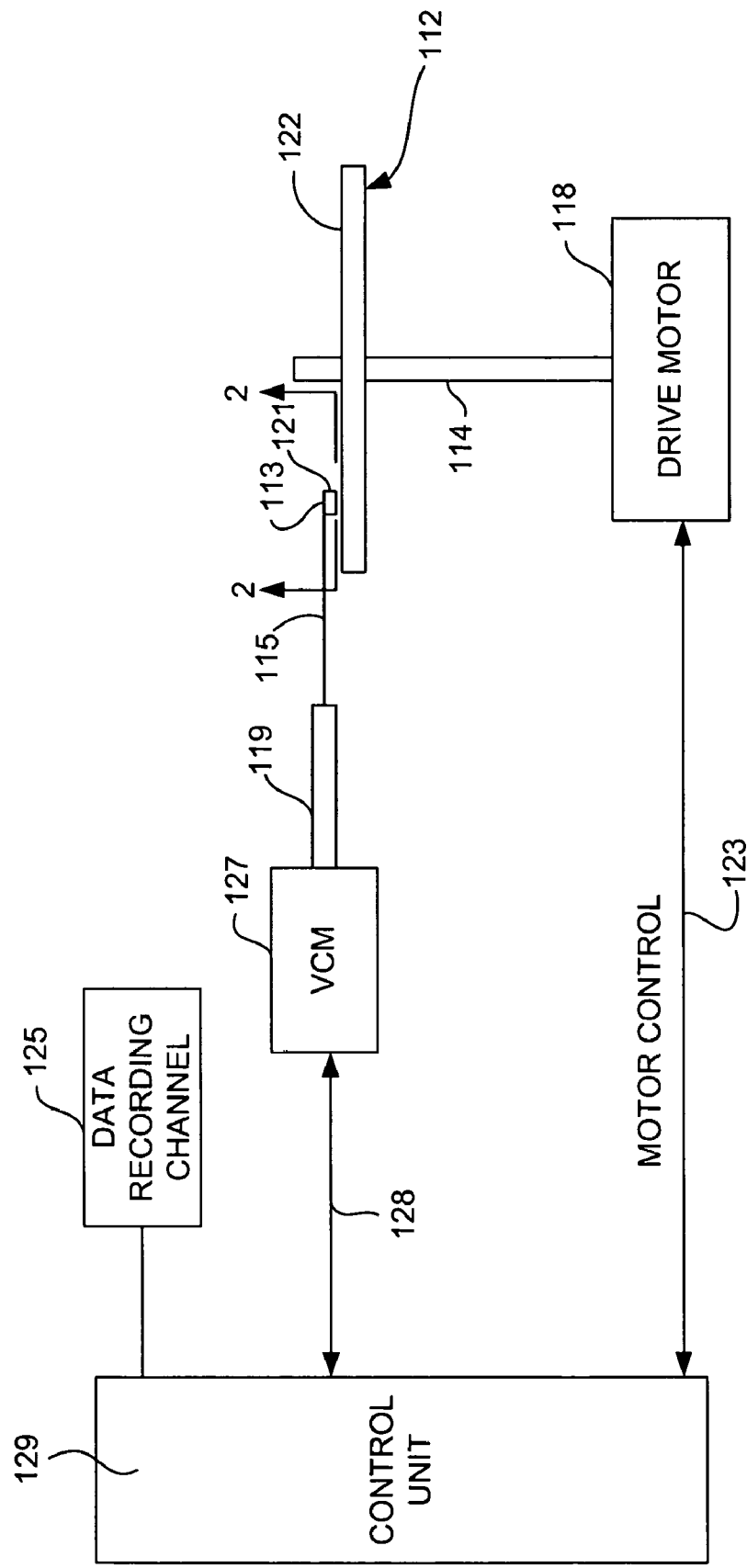
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
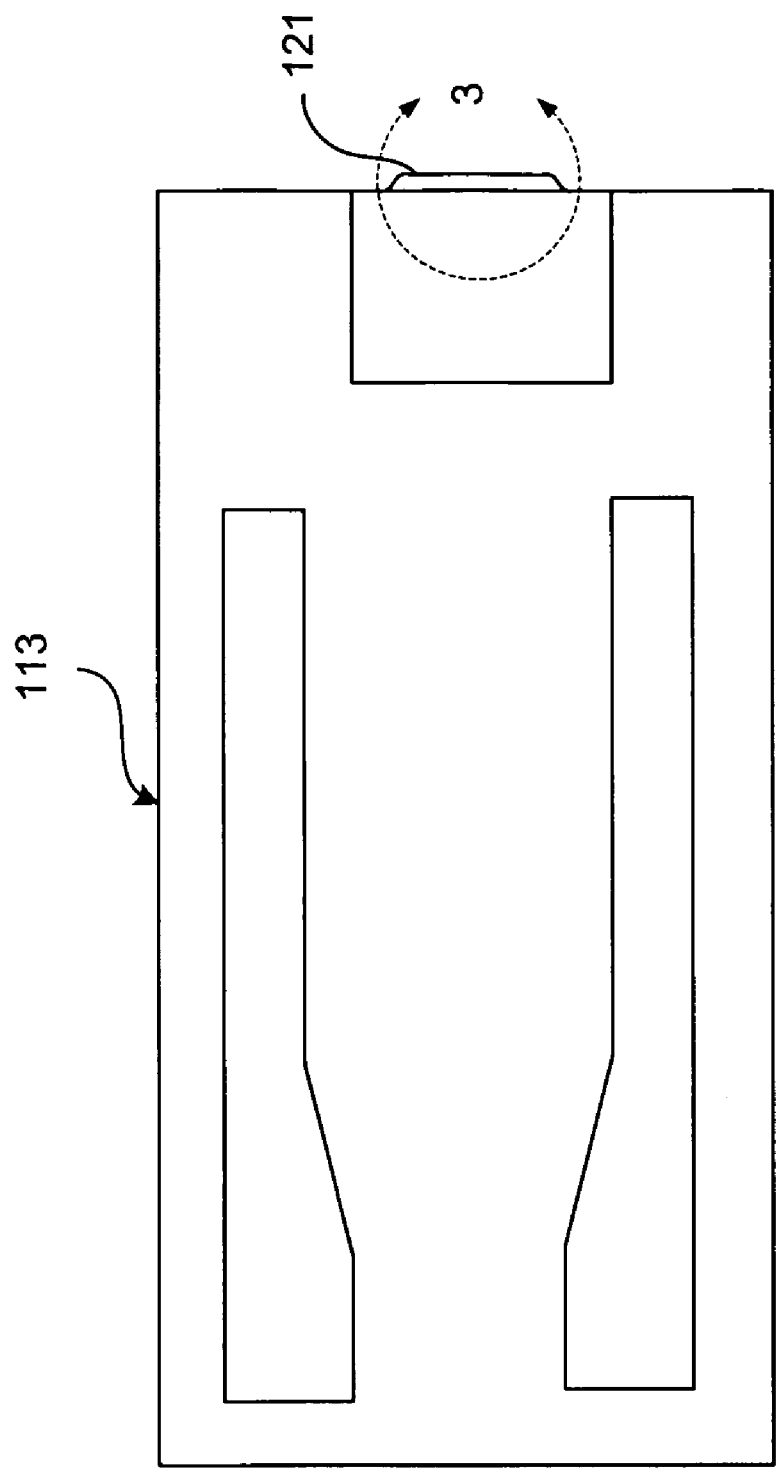
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
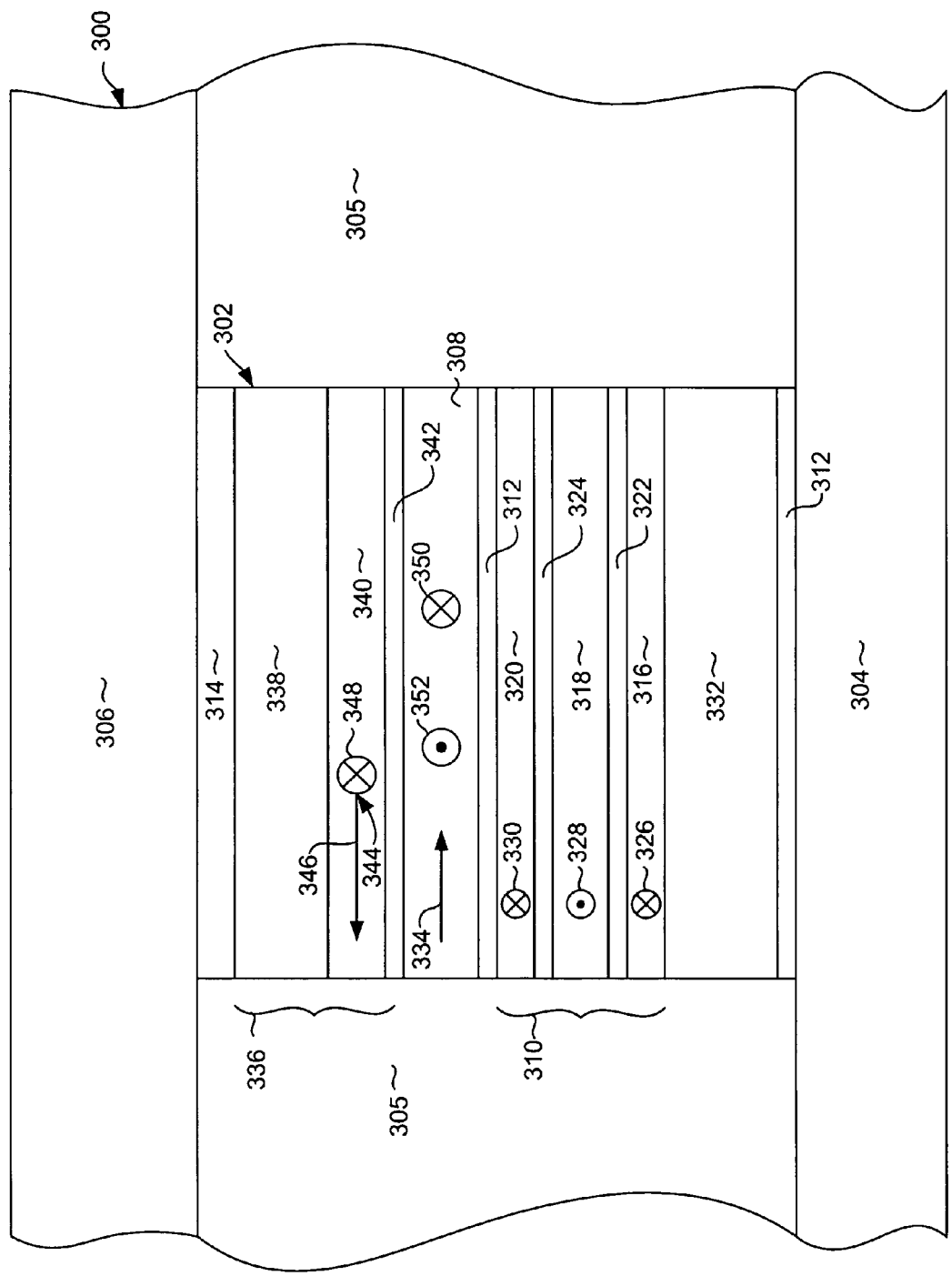
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads. Non-magnetic, electrically insulating gap material 305 fills the space between the shields 304, 306 outside of the sensor stack 302.

The sensor stack 302 includes a magnetic free layer structure 308 and a magnetic pinned layer structure 310. The free layer 308 can be constructed as a single layer of, for example Co or CoFe or could be multiple layers such as a layers including two or more layers of Co, CoFe or NiFe. A thin, non-magnetic, electrically insulating spacer layer 312 such as Alumina ($Al_2O_3$) is sandwiched between the free and pinned layers 308, 310. It should be pointed out that the present invention is being described as a tunnel junction sensor or tunnel valve, however, the present invention could also be embodied in a GMR sensor, in which case a non-magnetic, electrically conductive spacer layer such as Cu would be sandwiched between the free and pinned layers 308, 310 rather than the electrically insulating barrier layer 312. The sensor stack 302 may also include a seed layer 312, formed at the bottom of the sensor stack 302 to promote a desired crystalline growth in the subsequently deposited layers, and may also include a capping layer 314, such as Ta, formed at the top of the sensor stack to protect the sensor layers from damage during manufacturing.

With continued reference to FIG. 3, The pinned layer structure 310 is preferably a tri-layer structure for reasons that will become apparent upon further discussion below. The tri-layer structure of the pinned layer 310 includes first second and third magnetic layers 316, 318 and 320 separated from one another by antiparallel coupling layers 322, 324. The magnetic layers 316, 318, 320 can be constructed of for example NiFe or CoFe or some other suitable magnetic material. The antiparallel coupling layers 322, 324 may be constructed of, for example Ru and may each have a thickness ranging from 2 to 10 Angstroms or about 8 Angstroms. The material and thickness of the AP coupling layers 322, 324 are chosen such that the magnetic layers 316, 318, 320 will have magnetic moments 326, 328, 330 that are antiparallel to that of the adjacent magnetic layer and oriented perpendicular to the ABS and in and out of the plane of the page as indicated by arrow head and arrow tail symbols 326, 328, 330. The magnetic moments 326, 328, 330 of the pinned layer 310 may be pinned by an antiferromagnetic layer (AFM layer) 332, or alternatively may be self pinned. The AFM layer 332 may be constructed of several ferromagnetic materials and is preferably constructed of PtMn. The AFM layer 332 is exchange coupled with the first magnetic layer 316 which strongly pins the magnetic moment 326 of that layer. Antiferromagnetic coupling across the coupling layers 322, 324 pins the moments 328, 330 of the other layers 318, 320. In order to ensure strong pinning of the magnetic layers 316, 318, 320 the net magnetic moment of the pinned layer 310 should be near zero. In the case of a three layer pinned layer structure 310, this means that the magnetic thicknesses of the outermost magnetic layers 316, 320 should be equal to the magnetic thickness of the middle layer 318. Put another way, the sum of the magnetic thicknesses of all layers having a moment in a first direction should be equal to the sum of the magnetic thicknesses of the magnetic layers having a moment in the opposite direction. It should be pointed out that although the pinned layer 310 is described as a three layer structure, it could have any number of magnetic layers. Three magnetic layers is however the preferred embodiment.

With reference still to FIG. 3, the free layer 308 has a magnetic moment 334 that is biased parallel with the ABS and perpendicular to the moments 330, 328, 326 of the pinned layer structure 310. The free layer 308 is biased such that it is free to rotate in response to a magnetic field. The moment 334 of the free layer is biased by an in stack bias structure 336 that includes a magnetic pinning layer 338, a ferromagnetic, pinned biasing layer 340 and an AP coupling layer 342 that is constructed of, for example, Ru and is of such a thickness as to cause an antiparallel coupling between the free layer 308 and bias layer 340 that is sufficiently weak to maintain free layer sensitivity and strong enough to provide sufficient free layer stability. The AFM pinning layer 338 may be constructed of several antiferromagnetic materials and is preferably constructed of a material having a blocking temperature that is different from (preferably lower than) the blocking temperature of the AFM layer 332 used to pin the pinned layer. The bias structure pinning layer 338 is preferably constructed of IrMn. The pinned biasing layer 340 is can be constructed of several magnetic materials and is preferably constructed of CoFe.

The bias structure pinning layer 338 strongly fixes the magnetic moment of the bias layer 340 by exchange coupling with the bias layer 340. The bias layer 340 has a pinned magnetic moment 344 that is canted with respect to the ABS, having a longitudinal component 346 that is parallel with the ABS and a transverse component 348 that is perpendicular to the ABS and in the same direction as the moment 330 of the nearest magnetic layer 320 of the pinned layer structure 310.

The magnetic layer 330 of the of the pinned layer structure 310 imposes a coupling field 350 on the free layer 308, which pushes the moment 334 away from its desired direction parallel with the ABS. If left unchecked, this coupling field 350 would cant the biased magnetic moment 334 away from its desired direction, resulting in an asymmetric signal being produced by the sensor. In order to counterbalance this coupling field, the moment 344 of the pinned bias layer 340 is canted as described above so that the component 348 is parallel with the moment 330 of the pinned layer 320, and also with the coupling field 350. Antiparallel coupling across the AP coupling layer 342 results in a balancing field 352 that counterbalances the coupling field, resulting in a balanced moment 334 that is parallel with the ABS. Therefore, the transverse component 348 of the bias layer moment 344 is of such a strength to produce an antiparallel balancing field 352 that has a strength equal and opposite to the strength of the coupling field 350. While in prior art sensors, a field from the sense current was used to counterbalance this coupling field 350, no such field is available in a CPP sensor design. What's more, the very thin (3 to 5 Angstroms) barrier layer generates a much stronger coupling field than would be the case in a GMR sensor having a thicker, electrically conductive spacer layer. The balancing field 352 provided by the present invention allows the CPP sensor (whether tunnel valve or GMR) to have a desired symmetric signal.

The magnetic orientations of the pinned, free, and biasing layers 308, 310, 338 can be set by a series of anneal procedures. First to set the pinned layer moments 326, 328, 330, the sensor 300 is exposed to a strong magnetic field (13 to 15 KOe) while the sensor 300 is heated to a temperature above the blocking temperature of the AFM pinning layer 332 (265 degrees C. for CoPt). This magnetic field is maintained while the sensor 300 is cooled to a temperature below its blocking temperature. The magnetic field used to pin the pinned layers must be strong enough to overcome the AP coupling of the magnetic layers 316, 318, 320. This will cause all of the moments of these layers to be oriented in the direction in which the first magnetic layer 316 adjacent to the AFM 332 will be oriented. When the sensor 300 is cooled and the field is removed, the first magnetic layer 316 will be strongly pinned by exchange coupling with the AFM layer and the moments 328, 330 of the other layers 318, 320 will orient themselves antiparallel to one another.

After the pinned layer magnetization has been set, a separate anneal can be performed to set the moment 344 of the bias layer 340. In order to set the moment of the biasing layer 340, the sensor 300 is heated to a temperature that is above the blocking temperature of the AFM layer 338. Preferably, the AFM layer 338 is constructed of a material having a lower blocking temperature than that of the AFM pinning layer 332. In this way, the sensor 300 can be raised to a temperature that is between the blocking temperatures of the biasing AFM layer 338 and that of the pinning AFM layer 332. This will help prevent the bias anneal from negatively affecting the previously performed pinned layer anneal.

With the sensor raised to a temperature above the blocking temperature of the biasing AFM layer 338, a field is applied in the desired canted direction, having the desired component in parallel with the ABS and a desired component in the direction perpendicular to the ABS as described above. The sensor can be cooled while this magnetic field is maintained, and once cooled below the blocking temperature of the biasing AFM 338, the moment 344 will be strongly pinned in the desired canted direction.

It should be pointed out that, since the transverse component of the field used to set the biasing layer 340 is in the same direction as the moment 326 of the previously set AFM pinned layer 316, the setting of the bias layer moment 344 will not degrade the previously set pinning of the pinned layer 316. It is for this reason that a tri-layer structure 310 is preferred. Alternatively, if careful attention is paid to the strength magnetic field strength and temperature used to set the biasing layer 340, the biasing anneal can be performed without damaging the pinning of the pinned layer 308 even if a traditional two layer AP pinned structure is used for the pinned layer.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor having an ABS surface, the sensor comprising:
   a free layer;
   a pinned layer structure;
   a non-magnetic electrically insulating barrier layer sandwiched between the free layer and the pinned layer structure; and
   an in stack bias structure formed adjacent to the free layer and comprising:
      a layer of antiferromagnetic material (AFM layer);
      a ferromagnetic biasing layer exchange coupled with the AFM layer; and
      a non-magnetic, antiparallel coupling layer sandwiched between the free layer and the ferromagnetic biasing layer, the coupling layer being constructed of a material and thickness to antiparallel couple the ferromagnetic bias layer and the free layer; and
   wherein the biasing layer has a magnetic moment that is canted with respect to the ABS having a longitudinal component parallel with the ABS and a transverse component perpendicular with the ABS.

2. A sensor as in claim 1, wherein the pinned layer structure imposes a coupling field on the free layer in a direction perpendicular to the ABS, and wherein the transverse component of the magnetic moment of the ferromagnetic bias layer has a strength sufficient to generate a counterbalancing magnetic field in the free layer that is substantially equal and opposite to the coupling field.

3. A magnetoresistive sensor as in claim 1, wherein the AP coupling layer sandwiched between the ferromagnetic biasing layer and the free layer is Ru having a thickness of 2 to 8 Angstroms.

4. A magnetoresistive sensor as in claim 1, wherein the AFM layer of the biasing structure comprises IrMn.

5. A magnetoresistive sensor as in claim 1, wherein the AFM layer of the biasing structure comprises IrMn and wherein the pinned layer structure is pinned by exchange coupling with a layer of PtMn.

6. A magnetoresistive sensor having an air bearing surface (ABS), the sensor comprising:
   a pinned layer structure comprising first second and third ferromagnetic pinned layers, the second ferromagnetic layer being located between the first and third layers, the second ferromagnetic layer having a magnetic thickness substantially equal to the sum of magnetic thicknesses of the first and third ferromagnetic layers, the pinned layer structure further comprising a first antiparallel coupling layer sandwiched between the first and second ferromagnetic layers and a second antiparallel coupling layer sandwiched between the second and third ferromagnetic layers;

a first layer of antiferromagnetic material exchange coupled to the first ferromagnetic layer;

a free magnetic layer;

a non-magnetic, electrically insulating barrier layer sandwiched between the free layer and the third ferromagnetic layer of the pinned layer structure; and a bias structure comprising a second layer of AFM material, a ferromagnetic bias layer exchange coupled with the second layer of AFM material, and a third antiparallel coupling layer sandwiched between the ferromagnetic biasing layer and the free layer, the coupling layer being of a material and thickness to antiparallel couple the magnetic moments of the bias layer and the free layer; and wherein the biasing layer has a magnetic moment that is pinned in a direction that has a component in a longitudinal direction parallel with the ABS and a component that in a transverse direction that is perpendicular to the ABS.

7. A sensor as in claim 6 wherein the third magnetic layer causes a coupling field in the free layer, and wherein the transverse component of the magnetic moment of the bias layer is of such a strength as to generate a counter balance moment in the free layer that is substantially opposite and equal to the coupling field.

8. A sensor as in claim 6, wherein the transverse component of the biasing layer is oriented in the same direction as the moment of the first ferromagnetic layer of the pinned layer structure.

9. A sensor as in claim 6, wherein the first AFM layer comprises PtMn and the second AFM layer comprises IrMn.

10. A sensor as in claim 6 wherein the first AFM layer comprise a material having a higher blocking temperature than that of the second AFM layer.

11. A sensor as in claim 6 wherein the first AFM layer comprise a material having a higher blocking temperature than that of the second AFM layer.

12. A magnetic disk drive data recording system, comprising:

a magnetic disk;

an actuator;

a slider connected with the actuator for movement adjacent to a surface of the disk; and a magnetoresistive sensor connected with the slider, the senor comprising:

a free layer;

a pinned layer structure;

a non-magnetic electrically insulating barrier layer sandwiched between the free layer and the pinned layer structure; and an in stack bias structure formed adjacent to the free layer and comprising:

a layer of antiferromagnetic material (AFM layer);

a ferromagnetic biasing layer exchange coupled with the AFM layer; and a non-magnetic, antiparallel coupling layer sandwiched between the free layer and the ferromagnetic biasing layer, the coupling layer being constructed of a material and thickness to antiparallel couple the ferromagnetic bias layer and the free layer; and wherein the biasing layer has a magnetic moment that is canted with respect to the ABS having a longitudinal component parallel with the ABS and a transverse component perpendicular with the ABS.

* * * * *